(12) United States Patent
Bohling et al.

(10) Patent No.: US 9,518,192 B2
(45) Date of Patent: Dec. 13, 2016

(54) PROCESS FOR IMPROVING HIDING EFFICIENCY IN PIGMENTED PAINTS

(75) Inventors: James C. Bohling, Lansdale, PA (US); Deborah G. Fradkin, Harleysville, PA (US); Wei Gao, Fort Washington, PA (US); John W. Hook, III, Warminster, PA (US); Tao Wang, Highton (AU); Tao Wang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 227 days.

(21) Appl. No.: 14/131,071

(22) PCT Filed: Jul. 5, 2011

(86) PCT No.: PCT/CN2011/076838
§ 371 (c)(1),
(2), (4) Date: Oct. 6, 2014

(87) PCT Pub. No.: WO2013/004004
PCT Pub. Date: Jan. 10, 2013

(65) Prior Publication Data
US 2015/0025172 A1    Jan. 22, 2015

(51) Int. Cl.
| C08J 3/215 | (2006.01) |
| C08K 3/22 | (2006.01) |
| C09D 133/08 | (2006.01) |
| C09C 1/36 | (2006.01) |
| C09D 135/06 | (2006.01) |
| C09D 5/02 | (2006.01) |
| C09D 7/12 | (2006.01) |
| C09D 7/14 | (2006.01) |
| C08K 3/20 | (2006.01) |

(52) U.S. Cl.
CPC ............... *C09D 133/08* (2013.01); *C08K 3/20* (2013.01); *C08K 3/22* (2013.01); *C09C 1/3676* (2013.01); *C09D 5/028* (2013.01); *C09D 7/1216* (2013.01); *C09D 7/14* (2013.01); *C09D 135/06* (2013.01); *C01P 2004/62* (2013.01); *C08K 2003/2241* (2013.01)

(58) Field of Classification Search
USPC .................. 523/335; 524/431, 847; 526/274
See application file for complete search history.

(56) References Cited

U.S. PATENT DOCUMENTS

| 3,772,046 A * | 11/1973 | Knapp ................. C09C 1/3692 106/448 |
| 5,412,019 A | 5/1995 | Roulstone et al. |
| 6,080,802 A | 6/2000 | Emmons et al. |
| 7,179,531 B2 | 2/2007 | Brown et al. |
| 7,323,280 B2 | 1/2008 | Morris et al. |
| 8,546,467 B2 * | 10/2013 | Bohling ............... C09C 1/3676 523/205 |
| 2003/0018103 A1 | 1/2003 | Bardman et al. |
| 2004/0151910 A1 | 8/2004 | Koller et al. |
| 2010/0298483 A1 | 11/2010 | Allen et al. |
| 2011/0196088 A1 | 8/2011 | Hawkett et al. |

FOREIGN PATENT DOCUMENTS

| CN | 102079825 A | 6/2011 |
| EP | 0625541 A2 | 11/1994 |

OTHER PUBLICATIONS

Imae et al., "The pH dependence of dispersion of TiO2 particles in aqueous surfactant solutions," Colloid Poly, Sci 269, 1991, pp. 43-48.

Malgat et al., "Specific influence of univalent cations on the ionization of alumina-coated TiO2 particles and on the adsorption of poly(acrylic)acid," Journal of Colloid and Interface Science 269, 2004, pp. 320-328.

\* cited by examiner

*Primary Examiner* — Tae H Yoon
(74) *Attorney, Agent, or Firm* — Reid S. Willis

(57) ABSTRACT

The present invention relates to a process comprising the steps of a) contacting an aqueous dispersion of a $TiO_2$ slurry containing adsorbing dispersant with an adsorbing latex to form a mixture, wherein the pH of the mixture of the $TiO_2$ slurry and adsorbing latex are sufficiently high to inhibit interaction between the $TiO_2$ and the adsorbing latex; then b) lowering the pH of the mixture of step a) sufficiently to promote interaction between the $TiO_2$ and the adsorbing latex, thereby forming a composite. The process of the present invention provides for improved hiding and reduced grit for coatings compositions.

8 Claims, No Drawings

PROCESS FOR IMPROVING HIDING EFFICIENCY IN PIGMENTED PAINTS

This application is the 371 U.S. National Phase application of PCT International Application No. PCT/CN2011/076838, filed Jul. 5, 2011, and the disclosure of which is incorporated herein by reference in its entirety.

BACKGROUND OF THE INVENTION

Latex binders that adsorb to $TiO_2$ are known to form composites with $TiO_2$, leading to greater pigment efficiency in paint films. It is possible to use the adsorbing polymer as a portion of the binder in the paint (pre-composite) to maximize hiding and to use a second non adsorbing (let-down) binder to achieve other desired properties and to reduce cost. One of the problems often observed with current pre-composite technology is formation grit occurring during the preparation of the composite arising from the uncontrolled reaction of the pre-composite with $TiO_2$. To control grit, the formulator must carefully mix the adsorptive latex with the pigment under controlled conditions to avoid flocculation, which often requires expensive high shear mixing. It would, therefore, be an advantage to reduce grit formation in formulations that include latex binder and $TiO_2$ in a controlled and cost-effective manner.

SUMMARY OF THE INVENTION

The present invention addresses a need in the art by providing a process comprising the steps of a) contacting an aqueous dispersion of a $TiO_2$ slurry containing adsorbing dispersant with an adsorbing latex to form a mixture, wherein the pH of the mixture of the $TiO_2$ slurry and adsorbing latex are sufficiently high to inhibit interaction between the $TiO_2$ and the adsorbing latex; then b) lowering the pH of the mixture of step a) sufficiently to promote interaction between the $TiO_2$ and the adsorbing latex, thereby forming a composite. The process of the present invention provides for better hiding and reduced grit for coatings compositions.

DETAILED DESCRIPTION OF THE INVENTION

The present invention is a process comprising the steps of a) contacting an aqueous dispersion of a $TiO_2$ slurry containing adsorbing dispersant with an adsorbing latex, wherein the pH of the mixture of the $TiO_2$ slurry and the adsorbing latex are sufficiently high to inhibit interaction between the $TiO_2$ and the adsorbing latex; then b) lowering the pH of the composition of step a) sufficiently to promote interaction between the $TiO_2$ and the adsorbing latex, thereby forming a composite.

In the first step, an aqueous dispersion of $TiO_2$ and the dispersant ($TiO_2$ slurry) are contacted with an adsorbing latex (also referred to as pre-composite). The pH of the $TiO_2$ slurry is pre-adjusted with a suitable base from its nominal level, typically from about 8 to 9, to a level sufficiently high to inhibit interaction between the $TiO_2$ and the subsequently added adsorbing latex. Preferably, the pH is raised to from about 10 to about 12. The pH of the mixture is advantageously maintained for a sufficient time to remove from 30 to 50% of the dispersant adsorbed on the surface of the $TiO_2$ particles; depending on the nature of the dispersant and the surface properties of the $TiO_2$, this delay time is generally in the range of from about 10 minutes to about 24 h. After a suitable delay time, the pH is then lowered back to a desired level, generally to between 8.5 and 9.

The pH of the adsorbing latex is also at or raised to a level so that the latex, when contacted with the $TiO_2$ slurry, results in a mixture having a pH sufficiently high to inhibit interaction between the $TiO_2$ and the adsorbing latex. Thus, for example, an adsorbing latex at pH ~10 can be mixed with a $TiO_2$ slurry at pH ~10 to achieve the desired affect; it is also possible to achieve the same result by mixing an adsorbing latex having a relatively low pH (~8.5) with a $TiO_2$ slurry having a relatively high pH (~12), so long as the resulting mixture has a pH sufficiently high to inhibit interaction between the $TiO_2$ particles and the adsorbing latex.

The base used to raise the pH can be organic or inorganic. Examples of suitable organic bases include alkanol amines such as 2-amino-2-methyl-1-propanol and 2-amino-2-ethyl-1,3-propane-diol; examples of suitable inorganic bases include alkali metal and alkaline earth hydroxides and carbonates such as NaOH, KOH, and $Na_2CO_3$. Ammonia is also a suitable base.

Suitable pre-composites include acrylic, styrene-acrylic, vinyl ester, and ethylene-vinyl ester containing latexes. Acrylic latexes preferably contain structural units of (meth)acrylates such as methyl methacrylate, ethyl methacrylate, ethyl acrylate, butyl acrylate, and ethyl hexyl acrylate and combinations thereof. Preferred vinyl ester latexes are vinyl acetate latexes; preferred vinyl ester-ethylene latexes are vinyl acetate-ethylene latexes.

As used herein, the term "structural units" is used to refer to the groups formed from the polymerization of the corresponding monomer. Thus, a structural unit of methyl methacrylate is as illustrated:

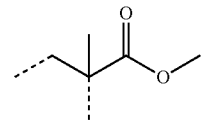

where the dotted lines indicate the points of connectivity to the polymer backbone.

The pre-composite further includes an adsorbing moiety, which is a functional group pendant to the polymer backbone that adsorbs to the surface of the $TiO_2$ particles. It is understood that $TiO_2$ particles may be surface treated with metal oxides such as alumina, silica, and zirconia oxides and combinations thereof. Thus, the adsorptivity of the surface of the $TiO_2$ particles varies with the nature of the surface treatment.

Typically, the adsorbing moiety includes structural units of an acid monomer, such as a phosphorus acid-containing monomer at a concentration preferably in the range of from 0.1 to 5 weight percent, based on the weight of the pre-composite. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylate, with phosphoethyl methacrylate being especially preferred.

$TiO_2$ is generally supplied as a powder, which is rendered into an aqueous dispersion, or as an aqueous slurry. In either case, a dispersant, which adsorbs to the surface of the $TiO_2$, is generally used to stabilize the pigment particles. The adsorbed particles disadvantageously prevent adsorption of adsorbing latex particles (pre-composite particles) that are blended with the slurry to improve hiding efficiency.

An increase in pH appears to provide a mechanism for removing dispersant from the surface of the $TiO_2$ particles where dispersant removal is desired. Thus, when the latex is added to the high pH slurry, the latex particles can outcompete the dispersant for adsorption to the surface of the $TiO_2$ particles once the pH is lowered sufficiently to promote adsorption; this phenomenon occurs because the latex particles have a greater affinity than the dispersant for the $TiO_2$. The pH can be lowered with a suitable acid, for example citric acid; however, if the base used to raise the pH is volatile (e.g., ammonia), it would be possible to lower pH with an acid or by allowing the base to evaporate or boil off.

Additionally, in a system where latex reactivity is not inhibited by dispersant, raising pH followed by adsorbing latex addition followed by lowering pH can be advantageous, especially in a system with very reactive pigment and latex. In the absence of "turning off" the reaction mechanism by raising pH, these especially reactive latexes and pigments can react with each other uncontrollably with the consequence of forming undesirable levels of grit. Using the processes described in the prior art, extreme care is generally required to control the rates of addition and mixing of the highly reactive pigment and latex to offset the detrimental effects of their reactivity. Using the process of the present invention whereby reactivity is turned off at high pH and turned on at low pH allows for a controlled reaction that results in the dramatic reduction of grit.

The composite prepared by the process of the present invention can be formulated with any of a number of suitable components to make a coating composition such as a paint, including solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

EXAMPLES

The following examples are for illustrative purposes only and are not intended to limit the scope of the invention.

Example 1

Preparation of a $TiO_2$ Slurry, Composite, and Paint Formulation

A $TiO_2$ slurry was prepared by first adding TAMOL™ 851 Dispersant (A Trademark of The Dow Chemical Company or its Affiliates, 16.04 g) to water (558.96 g) and mixing at low speed. Tronox CR-826 grade $TiO_2$ powder (1925.0 g) was added slowly to the aqueous dispersant using a Cowles disperser. Once the pigment was fully incorporated, the disperser was set to 1800 to 2000 rpm for 20 min. This slurry was stored on a roller mill for at least 24 h before the next step.

A portion of the slurry (112.47 g) was then adjusted to pH 10 with AMP™-95 2-Amino-2-methyl-1-propanol (A Trademark of The Dow Chemical Company or its Affiliates, 0.46 g). The slurry was held at pH 10 overnight (~18 h), after which time the slurry was added to a mixture of the pre-composite polymer (115.29 g, pH=7.9) Foamstar A-34 defoamer (0.40 g), and water (20.02 g) with mixing speed of 450 rpm. The slurry/pre-composite mixture was then neutralized with citric acid (0.40 g) and diluted with water (9.75 g) to form a composite.

A portion of the composite (161.76 g) was added with mixing to a separate vessel containing RHOPLEX™ VSR-1050LOE Acrylic Emulsion (A Trademark of The Dow Chemical Company or its Affiliates, 47.68 g). Extender grind was then added to the vessel, followed by letdown, each prepared by mixing the ingredients shown in Table 1, in the amounts and in the order shown, to make the paint (208 mL). The paint was equilibrated overnight and found to have an S/mil of 6.92 by ASTM Test Method D-2805.70. Examples 2 and 3 were prepared by the procedure described for Example 1 except that the pH was adjusted to 10.5 for Example 2 and to 11 for Example 3.

Comparative Example 1 was prepared substantially as described for Example 1 except that the pH of the $TiO_2$ slurry for the comparator was not adjusted with base from as-supplied level of 8.5. The pH of the comparator readjusted to 8.87 with AMP™-95 2-Amino-2-methyl-1-propanol for the paint formulation.

Table 1 shows the recipes for the ingredients used to make paints for the Comparative Example and Examples 1-3. The pre-composite polymer for Examples 1-3 is 46 weight percent, based on the weight of water and the polymer; by weight, the pre-composite polymer is 54.0% butyl acrylate/43.0% methyl methacrylate/1.5% phosphoethyl methacrylate/0.2% methacrylic acid/0.5% ureido methacrylate, and further includes TAMOL™ 2002 APEO free Emulsion Dispersant (A Trademark of The Dow Chemical Company, 0.9 weight % based on the weight of dispersant solids and the pre-composite polymer solids).

| | Comp. Ex | Ex. 1 | Ex. 2 | Ex. 3 |
|---|---|---|---|---|
| Ingredients (g) | 8.5 pH | 10.0 pH | 10.5 pH | 11.0 pH |
| RHOPLEX ™ VSR-1050LOE Acrylic Polymer Emulsion | 47.68 | 47.68 | 47.68 | 47.68 |
| Composite Stage | | | | |
| Pre-Composite Polymer | 72.06 | 72.06 | 72.06 | 72.06 |
| Foamstar A-34 Defoamer | 0.25 | 0.25 | 0.25 | 0.25 |
| Water | 12.50 | 12.51 | 12.51 | 11.25 |
| TiO2 Slurry Premix | | | | |
| Tronox CR-826 + Tamol 851 | 70.29 | 70.29 | 70.29 | 70.29 |

-continued

|  | Comp. Ex | Ex. 1 | Ex. 2 | Ex. 3 |
|---|---|---|---|---|
| TiO2 Slurry | | | | |
| AMP ™-95 2-Amino-2-methyl-1-propanol | 0.09 | 0.29 | 0.51 | 1.17 |
| Post-Premix Composite | | | | |
| 10% Citric Acid | 0.00 | 0.25 | 1.54 | 5.25 |
| AMP ™-95 2-Amino-2-methyl-1-propanol | 0.08 | 0.00 | 0.00 | 0.00 |
| Water | 6.49 | 6.09 | 4.57 | 1.41 |
| Composite Total | 161.76 | 161.75 | 161.73 | 161.68 |
| Extender Grind | | | | |
| Water | 2.25 | 2.25 | 2.25 | 2.25 |
| TAMOL ™ 165A dispersant | 0.11 | 0.11 | 0.11 | 0.11 |
| BYK 348 Surfactant | 0.50 | 0.50 | 0.50 | 0.50 |
| Foamstar A-34 Defoamer | 0.50 | 0.50 | 0.50 | 0.50 |
| Minex 10 Extender | 4.41 | 4.41 | 4.41 | 4.41 |
| Water | 0.75 | 0.75 | 0.75 | 0.75 |
| Grind Total | 8.52 | 8.52 | 8.52 | 8.52 |
| Letdown | | | | |
| ROPAQUE ™ Ultra E pigment | 11.23 | 11.23 | 11.23 | 11.23 |
| Optifilm Enhancer 400 Coales. Aid | 1.81 | 1.81 | 1.81 | 1.81 |
| Potassium Hydroxide 5% | 0.65 | 0.65 | 0.65 | 0.65 |
| ACRYSOL ™ RM-2020 NPR Thickener | 7.70 | 7.70 | 7.70 | 7.70 |
| Water | 18.14 | 18.14 | 18.14 | 18.14 |
| ACRYSOL ™ RM-8W Thickener | 1.33 | 1.33 | 1.33 | 1.33 |
| Total | 257.47 | 257.46 | 257.44 | 257.39 |

All noted trademarks are owned by The Dow Chemical Company or Affiliates thereof.

Table 2 shows the effect on hiding of increasing pH to the range of 10-11, then lowering pH.

TABLE 2

Effect of Increasing and Decreasing pH on Hiding

|  | Comp. Ex. 1 | Ex. 1 | Ex. 2 | Ex. 3 |
|---|---|---|---|---|
| TiO$_2$ Slurry pH Properties | 8.5 | 10 | 10.5 | 11 |
| pH - Paint Formulation | 8.87 | 8.97 | 8.95 | 8.87 |
| S/mil | 6.55 | 6.92 | 7.01 | 7.08 |

The process of the present invention allows paint formulators to use grades of TiO$_2$ with varying degrees of reactivity for a given pre-composite; thus, the formulator no longer needs to tailor the reactivity of the pre-composite to the reactivity of the TiO$_2$.

Example 4 and Comparative Example 2

Grit Formation of Drawndown Samples

The pre-composite used for Example 4 and the Comparative Example 2 is the same as for Examples 1-3 except that it contains no TAMOL™ 2002 APEO free Emulsion Dispersant.

Comparative Example 2

Kronos 4311 TiO$_2$ pigment slurry (69.5 g, pH=8.5) was added with stirring into a mixture of the pre-composite (69.14 g, pH=7.9), water (22.2 g) and defoamer (0.25 g). The mixture, which had a 36% volume solids and a pigment volume concentration (PVC) of 31.7%, was drawn down into a film, whereupon grit was immediately observed.

Example 4

The TiO$_2$ slurry (70.3 g, adjusted to pH 10 with NH$_4$OH) and the pre-composite (69.7 g, adjusted to pH 10 with NH$_4$OH), defoamer (0.25 g), and water (21.3 g) were combined and mixed with stiffing substantially as carried out for Comparative Example 2. After about 10 min, the pH was adjusted to ~8.5 with citric acid. The mixture was then drawn down into a film and no grit was observed.

Kubelka-Munk S/mil Test Method

S/mil was determined for each of the final paint formulations as follows:

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The y-reflectance was measured using a BYK Gardner 45° Reflectomer in each of the scribed areas five times measuring on a diagonal starting at the top of the rectangle and the average y-reflectance recorded. A thick film draw down was prepared for each paint on Black Vinyl Charts (Leneta Form P121-10N) using a 3" 25 mil block draw down bar and the charts were allowed to dry overnight. The y-reflectance was measured in five different areas of the draw down and the average y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \quad \text{Equation 1}$$

where X is the average film thickness, R is the average reflectance of the thick film and R$_B$ is the average reflectance over black of the thin film. X can be calculated from the weight of the paint film (W$_{pf}$), the density (D) of the dry film; and the film area (A). Film area for a 3.25"×4" template was 13 in$^2$.

$$X(\text{mils}) = \frac{W_{pf}(g) \times 1000(\text{mil/in})}{D(\text{lbs/gal}) \times 1.964(g/\text{in}^3/\text{lbs/gal}) \times A(\text{in})}$$

The invention claimed is:

1. A process comprising the steps of:
    a) contacting an aqueous dispersion of a TiO$_2$ slurry containing adsorbing dispersant with an adsorbing latex comprising structural units of a phosphorus acid monomer to form a mixture, wherein the pH of the mixture of the TiO$_2$ slurry and the adsorbing latex is maintained at about 10 to 12 for a time in the range of 10 minutes to 24 hours to inhibit interaction between the TiO$_2$ and the adsorbing latex; then
    b) lowering the pH of the mixture of step a) to promote interaction between the TiO$_2$ and the adsorbing latex, thereby forming a composite; wherein prior step to step a) the pH of the TiO$_2$ slurry is raised from about 8 to 9 to about 10 to 12.

2. The process of claim 1 wherein the pH of the TiO$_2$ slurry is raised with an alkanol amine.

3. The process of claim 1 which further includes the step of formulating the composite into a paint composition.

4. The process of claim 1 which further includes the step of mixing the composite with an additive selected from the group consisting of rheology modifiers, pigments, extenders, binders dispersants, defoamers, preservatives, biocides, flow agents, and leveling agent, and combinations thereof.

5. A process comprising the steps of:
a) contacting an aqueous dispersion of a $TiO_2$ slurry containing adsorbing dispersant with an adsorbing latex comprising structural units of a phosphorus acid monomer to form a mixture, wherein the pH of the mixture of the $TiO_2$ slurry and the adsorbing latex is maintained at about 10 to 12 for a time in the range of 10 minutes to 24 hours to inhibit interaction between the $TiO_2$ and the adsorbing latex; then
b) lowering the pH of the mixture of step a) to a range of from 8.5 to 9 to promote interaction between the $TiO_2$ and the adsorbing latex, thereby forming a composite wherein prior step to step a) the pH of the $TiO_2$ slurry is raised from about 8 to 9 to about 10 to 12.

6. The process of claim 5 wherein the pH of the $TiO_2$ slurry is raised with an alkanol amine.

7. The process of claim 5 which further includes the step of formulating the composite into a paint composition.

8. The process of claim 5 which further includes the step of mixing the composite with an additive selected from the group consisting of rheology modifiers, pigments, extenders, binders dispersants, defoamers, preservatives, biocides, flow agents, and leveling agent, and combinations thereof.

* * * * *